HEINRICH MEIER and
HANSJÖRG WALCH, Inventors

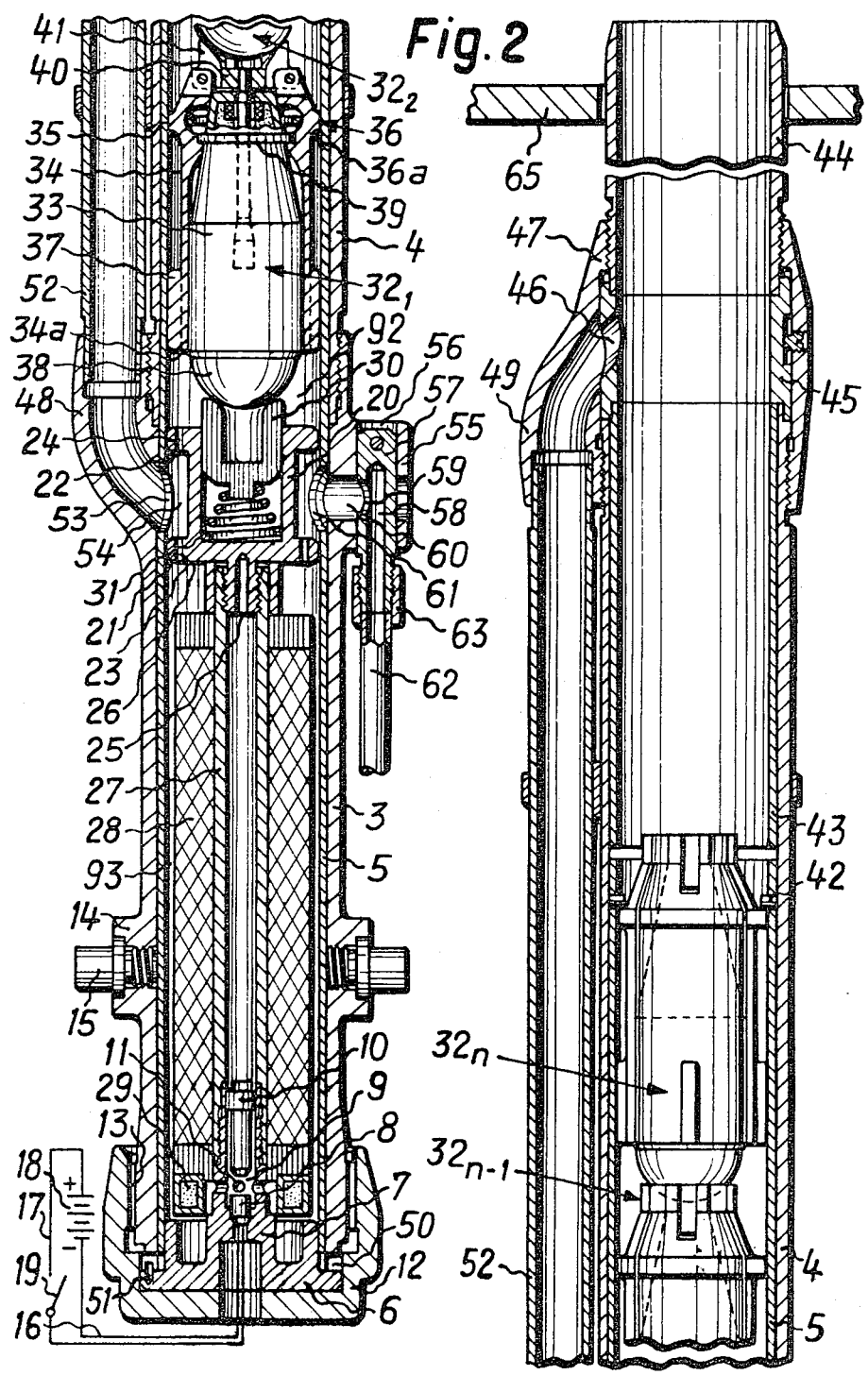

United States Patent Office 3,623,398
Patented Nov. 30, 1971

3,623,398
MISSILE LAUNCHER WITH MISSILES ON
AN AIRCRAFT
Heinrich Meier, Rumlang, and Hansjörg Walch, Niederglatt, Switzerland, assignors to Werkzeugmaschinenfabrik Oerlikon-Buhrle AG, Zurich, Switzerland
Filed Oct. 13, 1969, Ser. No. 865,654
Claims priority, application Switzerland, Oct. 29, 1968, 16,106/68
Int. Cl. B64d 1/04
U.S. Cl. 89—1.5 R
7 Claims

ABSTRACT OF THE DISCLOSURE

A row of missiles is arranged in a launcher tube sealed at one end. A propellant charge arranged between the tube seal and the row of missiles generates propellant gases, which are conducted both behind and in front of the row of missiles. The pressure of the propellant gases in front of and behind the row of missiles is of such proportions that the row of missiles is moved slowly through the launcher tube. When the respectively foremost missile passes the point where the propellant gases are conducted in front of the row of missiles, it is accelerated out of the launcher tube. A regulating member is connected to the propellant source and is operated by a device which measures the speed of the aircraft. The pressure of the propellant gases is thereby automatically regulated in accordance with the speed of the aircraft, whereby the rhythm and the muzzle velocity of the missiles are regulated accordingly.

---

The invention relates to a missile launcher with missiles on an aircraft.

The aim of the invention is to provide a missile launcher in which a row of missiles are fired by a single propellant charge from the launcher tube. Furthermore, the aim of the invention is to design the missile launcher in such a way that the missiles leave the launcher tube with a muzzle velocity and rhythm adapted to the speed of the aircraft, whereby a uniform spacing is obtained with regard to the points of impact of the missiles on the ground.

These and other embodiments of the invention will become clear through the following detailed description with reference to the drawings, whereby the figures of the drawings represent in detail:

FIG. 2 shows a longitudinal section through a missile launcher;

Figure 1:
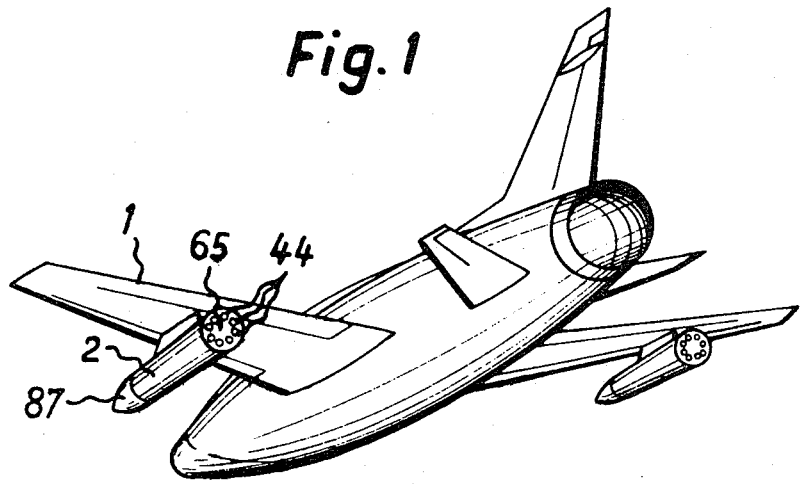
FIG. 1 shows a view of an aircraft having containers which carry missile launchers.

In accordance with FIG. 1, two containers 2 are suspended from the wings 1 of an aircraft. Each container 2 contains several missile launchers, which are arranged about its longitudinal axis. So that the missiles can be scattered over an area of a specific width, not all the longitudinal axes of the missile launchers lie parallel to the container axis, but are towards the rear partially directed slightly away from the vertical plane of symmetry of the container. The missile launchers are designed as follows:

As is shown by FIG. 2, the end of a pressure tube 3 is bolted to a tube 4 which is manufactured from light metal and which has the same internal diameter. A further tube 5, preferably consisting of hard paper, with a small wall thickness is inserted into the pressure tube 3 and the tube 4. The external diameter of this tube 5 is equal to the internal diameter of the pressure tube 3 and tube 4. A cover 6 is centred in the tube 5 and is connected to this latter and seals the front end of the pressure tube 3. A pin 51, which is directed parallel ot the axis of the pressure tube 3, engages into a radial groove 50 in the front face of the pressure tube.

The cover 6 has a central cylindrical extension 7, which extends into the tube 5. A primer capsule 8 is inserted into a central bore 9 of the extension 7. A stopper 10 seals the bore 9 at the rear. The extension 7 has four flash vents 11, which penetrate its wall and open behind the primer capsule 8 into the bore 9. The primer capsule 8 is connected by two leads 16, 17 to the two poles of an electrical voltage source 18. A switch 19 is incorporated into the lead 17.

A cap nut 12 embraces the cover 16 and is connected in known manner by a bayonet catch 13 releasably to the front end of the pressure tube 3. Two coaxial, radially directed and diametrically opposed extensions 14 project outwardly from the wall of the pressure tube 3. Screwed into the extensions 14 are bolts 15. A sleeve 20 is inserted into the tube 5. At its ends the sleeve 20 has flange-shaped extensions 21, 22, by which they are centred in the tube 5.

The extensions 21, 22 are bored at regular angular distances. The bores 23, 24 are directed parallel to the sleeve axis. A cylindrical extension 25 coaxial to the sleeve 20 projects forwardly from the sleeve base 26. A non-combustible sleeve 27 is connected to the extensions 7 and 25 of the cover 6 and of the sleeve 20. A hollow cylindrical body 28 (propellant charge body), consisting of propellant charge powder, is pushed onto the sleeve 27 and is connected securely to this latter. The external diameter of the propellant charge body 28 is smaller than the internal diameter of the tube 5. An annular priming charge 29 is fastened to the front face of the propellant charge body 28. The plane of symmetry of the priming charge 29 comprises the axes of the flash vents 11 in the extension 7 of the cover 6.

A sleeve-shaped supporting body 30 is guided shiftably in the sleeve 20 and protrudes rearwardly from this latter. A pressure spring 31 is incorporated between the front face of the supporting body 30 and the sleeve base 26. The cover 6 and the sleeve base 26 with flange extension 21 bound the combustion chamber 93. Several missiles $32_1$, $32_2$ . . . $32_{n-1}$, $32_n$ are stacked one behind the other in the tube 5. The missile body 33 of a missile 32 is completely embraced by four wings 34 butting against it, which represent segments of a hollow body of rotation. The external diameter of the wings 34 is smaller than the internal diameter of the tube 5. The wings 34 have outwardly projecting beads 35, which together form a ring 36. This ring 36 has only a very little play with regard to the tube 5. From each wing 34 there projects outwardly a rib 37 directed parallel to the missile axis. The ribs 37 serve, together with the ring 36, for the guidance of the missile 32 in the tube 5. The missile body 33 is sealed at the front by a hemispherical cap 38 and has, on its conical part, a flange extension 39. A discoid support 40 is arranged behind the base of the missile body 33. The support 40, on which the wings 34 are hinged, has rearwardly projecting extension 41. The caps 38 of the missiles 32 are braced against the extensions 41 of the support 40 of the respectively front missile 32. The cap of the first missile $32_1$ butts against the rear front face of the supporting body 30. Two pins 42 are fastened in the tube 5 and extend into the interior of the same. Under the action of the spring 31 acting on the row of missiles 32, the support 40 of the rearmost missile $32_n$ is kept butting against the pins 42.

The end of the tube 5 lies behind the rearmost missile $32_n$. The tube 5 forms one transportation unit together with the cover 6 of the propellant charge body 28, the sleeve 20 and the missiles 32. An extension tube 43 of like internal diameter to the tube 5 connects to the rear of this latter. A launcher tube 44 and a sleeve 45 have the same internal diameter as the tubes 5 and 43 and are arranged coaxially to this latter. The sleeve 45 is centered on the ends of the tube 43 and the launcher tube 44 and forms a connection between these latter. The axis of the bore 46 in the wall of the sleeve 45 forms an acute angle with the rearwardly directed axis of the launcher tube 44. A bush 47 embraces the sleeve 45 and is bolted to the ends of the tubes 4, 44 and holds the front faces thereof pressed tightly against the sleeve 45.

The bush 47 and the rear end of the pressure tube 3 have connection pieces 48, 49. The ends of these tubular curved connecting pieces 48, 49 are directed one towards the other. The centre lines of the connecting pieces 48, 49 lie in a plane which comprises the axis of the tube 5. This plane coincides with the median plane of the groove 50. A tube 52 is directed parallel to the tube 5 and is connected to the two connecting pieces 48, 49. The connecting piece 49 opens into the bore 46 of the sleeve 45. The wall of the tube 5 has, between the two planes which are formed by the flange extensions 21, 22 of the sleeve 20, an oval aperture 53, the central point of which lies in the same plane as the axis of the pin 51. The annular space 54, which is bounded by the flange extensions 21, 22 and the tube 5 and which surrounds the sleeve 20, is spatially connected by the aperture 53, the connecting piece 48, the tube 52, the connecting piece 49 and the bore 46 to the space bounded by the sleeve 45.

On its rear end the pressure tube 3 has an extension 55, which is diametrically opposed to the connection piece 48. The extension 55 has a bore 56 directed parallel to the axis of the pressure tube 3. A cylindrical connecting piece 57 with a blind bore 58 is placed into the bore 56 of the extension 55 and connected securely to this latter. An aperture 59 in the wall of the connecting piece 57 connects the blind bore 58 to the annular space 54 via a bore 60 penetrating the wall of the pressure tube 3 and an aperture 61 in the wall of the tube 5. A tube 62 is connected by a cap nut 63 to the connecting piece 57. This tube 62 leads to a regulating device which is described hereinunder. The missile launchers are, as shown in FIGS. 2 and 3, guided through the partition 64 and the tail wall 65 of the container 2 and are braced on these latter.

Figure 3:
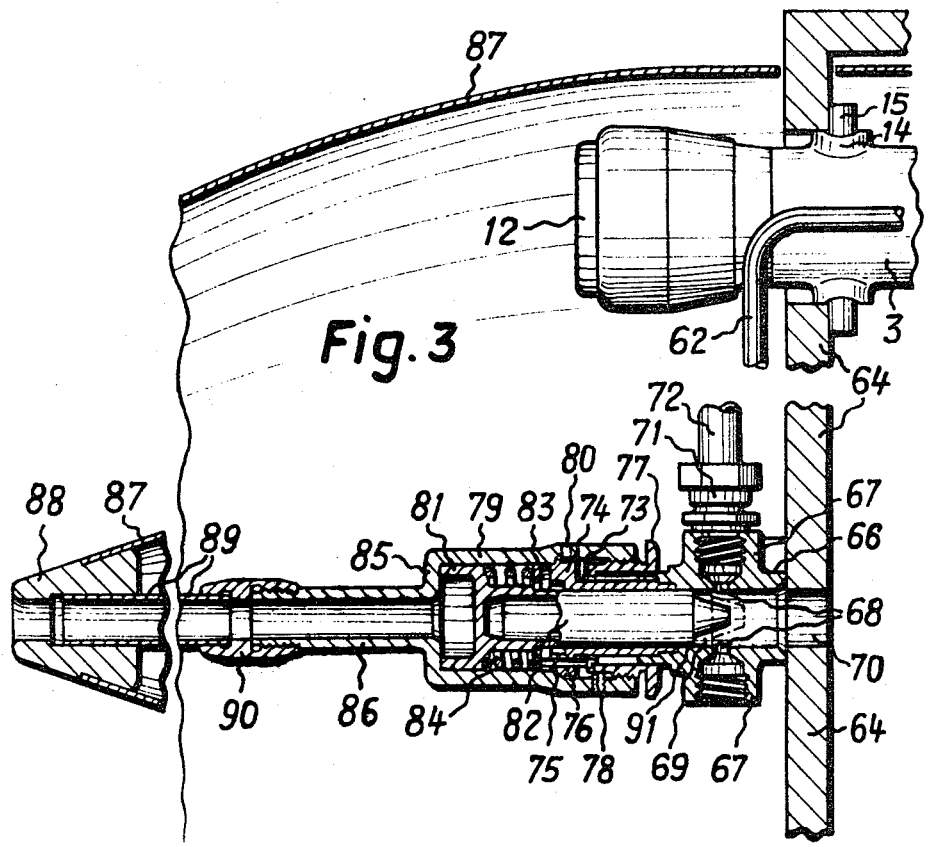
FIG. 3 shows a partial longitudinal section through the container, with a regulating device.

In accordance with FIG. 3, a regulating device is arranged centrally in the nose of the container 2. A sleeve-shaped collecting piece 66, the axis of which coincides with the axis of the container 2, is connected in a not further represented manner to the container wall 64. The collecting piece 66 has radially directed connection pieces 67. The connection pieces 67, arranged at like angular distances one from the other, are connected spatially by bores 68 to the central bore 69 of the collecting piece 66. This bore 69 opens into an aperture 70 of the container wall 64. Screwed into the connecting pieces 67 are connection pieces 71 of tubes 72, which are connected to the tubes 62 connected to the missile launchers. Those tubes 62 of missile launchers from which simultaneously missiles 32 are ejected are brought together into one of the tubes 72 and connected to one of the connecting pieces 67.

A sleeve 73 is connected to the front end of the collecting piece 66 and has a somewhat greater internal diameter than this latter. A flanged rim 74 on the front end of the sleeve 73 has three bores 75 directed parallel to the longitudinal axis. The bolts 76 are mounted shiftably in the bores 75. A further sleeve 79 is arranged concentrically to the sleeve 73 and embraces this latter with its rear end. The sleeve 79 is centred on the flanged rim 74 of the sleeve 73. A pin 80 is connected to the sleeve 79, engages into the flanged rim 74 and thereby secures the sleeve 79 against rotation. A sleeve 77 is screwed into the sleeve 79.

A piston 81 is mounted shiftably in the front part of the sleeve 79. The rear end of a rearwardly projecting cylindrical extension 82 of the piston 81 is guided in the bore 69 of the collecting piece 66 and seals this latter towards the front. A ring 83 embracing the piston extension 82 is shiftable in the sleeve 79. The piston 81 is braced in the position of rest under the pressure of a spring 84 arranged in the sleeve 79 with its front face on the base 85 of the sleeve 79. The rear end of the spring 84 loads the ring 83 and presses this latter against the front ends of the bolts 76. The rear ends of the bolts 76 are braced on a radially inwardly projecting flanged rim 78 of the sleeve 77. Through rotation of the sleeve 77, the bolts 76 and the ring 83 can be shifted and by this means the bias of the spring 84 can be adjusted. A tube 86 is connected to the sleeve base 85 and opens into the piston chamber encircled by the sleeve 79.

A conical cap 87 seals the container 2 at the front. A frustum-shaped centrally bored body 88 forms the tip of the cap 87. A tube 89 is fastened in the bore of the body 88 and is connected by a bush 90 releasably to the tube 86 connected to the sleeve 79.

The mode of operation emerges from the construction: Prior to the take-off of the aircraft which carries the container 2, the piston 81 of the regulating device finds itself, in accordance with FIG. 3, in the position of rest. The rear end of the piston extension 82 lies in front of the bores 68 of the collecting piece 66. After the take-off of the aircraft, the onflowing air dams up in front of the tip of the container 2. The pressure of the dammed-up air is propagated through the tubes 89 and 86 onto the piston 81. By this means, exerted on the same is a force which is directed contrary to the force of the prestressed spring 84. With an increasing speed of the aircraft, the magnitude of the air force acting on the piston 81 grows. This is, after a specific speed is exceeded, greater than the force of the spring 84, so that the piston 81 moves rearwards and the spring 84 is again tensioned.

In the case of an aircraft speed of by way of example 200 m./s., the edge 91 of the piston extension 82 has reached the rim of the bores 68, as is indicated in FIG. 3 by short lines and dots. The pilot of the aircraft can now initiate the ejection of the missiles 32 from the missile launchers by closing the switch 19 and applying an electrical voltage to the primer capsule 8. The primer capsule 81 detonates, through the flash vents 11, the priming charge 29 and this latter detonates the propellant charge 28.

The gases arising upon the combustion of the propellant charge 28 flow out of the combustion chamber 93 through the bores 23 in the flange extension 21 of the sleeve 20 into the annular space 54. A part of the gases accumulating in this annular space 54 flows off though the aperture 53 of the tube 5, the connecting piece 48, the tube 52, the connecting piece 49 and the bore 46 into the launcher tube 44 and rearwards out of this latter. A further part of the gases flows from the annular space 54 through the apertures and bores 61, 60, 58, the tube 62 and the bore 68 of the collecting piece 66 into the bore 69 thereof. From there the gas is conducted through the aperture 70 in the wall 64 into the open air in a manner not further represented.

Another part of the gases flows from the annular space 54 through the bores 24 in the flange extension 22 of the sleeve 20 into an annular space 92. This space 92 is bounded by the cap 38 of the missile $32_1$, the wings 34 of this missile and by the tube 5 and sealed at the rear by the ring 36 of the missile wings and at the front by the supporting body 30 and the flange extension 22 of the sleeve 20. Through the pressure building up in this space 92, the sleeve 20 is loaded with a force directed forwards. This force is transmitted by the sleeve 27 and the cover 6 to the cap nut 12, and by this latter via the pressure tube 3 and the bolts 15 to the container wall 64.

Furthermore, through the gas pressure prevailing in the space 92, via the cap 38 a rearwardly directed force is exerted on the missile $32_1$. Further equally directed gas forces act on the front faces 34a of the wings 34 and on the front face 36a of the ring 36. These forces are transmitted by the wings 34 via the flange extension 39, against which they butt with shoulders, to the missile body 33. The entire gas force acting on the missile body 33 acts via the support 40 and the extensions 41 thereof on the missile $32_2$ lying directly therebehind, and therewith also on the entire row of missiles braced on the pins 42. When the pressure in the chamber 92 and therewith the gas force acting on the row of missiles has received a specific magnitude, the pins 42 are sheared through. The row of missiles is now, since it is no longer held back, accelerated rearwards. As soon as the ring 36 of the rearmost missile $32_n$, upon the rearward movement thereof, has passed the bore 46 of the sleeve 45, the gas flowing in through this bore flows into a space which is bounded by the rings 36 of the rearmost ($32_n$) and second-rearmost ($32_{n-1}$) missile. Under the effect of the gas pressure prevailing in this space, the rearmost missile $32_n$ is accelerated further rearwards, through the launcher tube 44, so that it leaves the muzzle of the same with a specific relative speed, the muzzle velocity. At the same time the gas pressure also acts to the front on the row of missiles now reduced by one unit. The quantity of gas flowing in through the bore 46 is of such proportions that the time mean value of the gas pressure in this space is not quite as great as the gas pressure acting in front of the row of missiles on the foremost missile $32_1$. This difference in pressure suffices merely to overcome the frictional force which acts on the moved row of missiles. The row of missiles is therefore not further accelerated, but continues to move substantially at that conveying speed at which the ring 36 of the rearmost missile $32_n$ reached the bore 46.

As soon as the ring 36 of the second-rearmost missile $32_{n-1}$ has run over this bore 46, this missile is, like the previously launched missile $32_n$, accelerated through the launcher tube 44 and ejected at the same muzzle velocity as that one. Until the burnout of the propellant charge 28, also the remaining missiles $32_{n-2}, \ldots 32_1$ are launched.

During the movement of the missiles 32 rearwards, the space 92 becomes ever greater. The frictional force which acts on the row of missiles decreases with a diminishing number of missiles 32 forming this row. The quantity of gas flowing during the ejection of the missiles 32 into the enlargening space 92 is of such proportions that the gas pressure in this latter decreases steadily. The resulting force acting rearwardly on the row of missiles thereby also becomes steadily smaller, but is sufficient to overcome the frictional force becoming smaller with the decreasing number of missiles.

So that the direction of flight of the missiles 32 after emergence from the launcher tube 44 is the same as that of the aircraft and its absolute velocity has a specific magnitude, the muzzle velocity must be smaller than the speed of the aircraft. This absolute velocity of the missiles 32 is to be so great that the moment of resultant air force, which acts on a missile after the opening of the wings 34, suffices for the stabilisation thereof.

The magnitude of the conveying speed of the row of missiles is, together with the magnitude of the spacings of the rings 36 of two successive missiles 32 in the row, decisive for the chronological intervals at which the missiles leave the launcher tube 44. The points of impact of the missiles successively leaving the launcher tube 44 on the ground must, so that the greatest possible effect is achieved, have quite specific spacings, namely in the case of all the speeds, lying in a specific range, of the launching aircraft. The time intervals of the missiles 32 leaving the launcher tube 44 are therefore adjusted in the manner described hereinafter.

In the case of aircraft speeds which are greater than the already mentioned critical velocity, in other words by way of example greater than 200 m./s., the piston 81 is moved by (the) greater air pressure-head into positions in which the edge 91 of its extension 82 closes the bores 68 more or less strongly and therewith throttles the gas flow-off from the annular space 54 to a greater or lesser extent. Since the gas supply through the bores 23 from the combustion chamber 93 into the annular space 54 does not substantially decrease in the course of the ejection of the missiles 32, the pressure in this latter rises when the flow-off of the gas through the tube 62, or 72, decreases. By this means, a greater quantity of gas flows through the bores 24 into the space 92 in front of the row of missiles, so that in this latter a greater pressure prevails and the row of missiles is accelerated more severely and to a greater speed.

As soon as the ring 36 of the rearmost missile $32_n$ of the row has passed the bore 46, then, since also through the tube 52 a greater quantity of gas flows out of the annular space 54, a greater pressure is built up in that space which is bounded by the rings 36 of the rearmost ($32_n$) and the second-rearmost ($32_{n-1}$) missile. Consequently the rearmost missile $32_n$ is accelerated more severely, so that it leaves the launcher tube 44 at a greater muzzle velocity and it thus moves, despite the greater aircraft speed, at that absolute velocity which is necessary for the stabilisation.

Since the pressure both in the space 92 and in the space bounded by the rings 36 of the rearmost ($32_n$) and of the second-rearmost ($32_{n-1}$) missile of the row is greater, the difference of these pressures does not become greater. The row of missles thus continues to move even during the acceleration of the rearmost missile $32_n$ in the launcher tube 44 at that greater speed which this missile had during the crossing of the bore 46 by its ring 36. The missile 32 therefore arrive at shorter time intervals at the launcher tube 44 and emerge from this latter, so that despite the greater aircraft speed the points of impact of the missiles 32 on the ground have the same optimum spacing from one another as in the case of the lower aircraft speed.

This automatic harmonizing of the time intervals at which the missiles 32 leave the launcher tube 44 is advantageous insofar as it frees the pilot of the aircraft from having to keep the speed of the aircraft precisely to a specific value during the fulfilment of his combat mission.

When the tubes 5 are rid of the propellant charges 28 and the missiles 32, they can, after the sortie of the aircraft, after opening of the container hood 87 and releasing of the cap nut 12, be withdrawn from the pressure tubes 3 and the tubes 4 of the missile launchers and be replaced within a short time by fresh tubes 5 containing propellant charges 28 and missiles 32.

We claim:
1. A missile launcher for an aircraft comprising a straight launcher tube sealed at one end, a tubular inside wall for the missiles arranged in a row, said missiles having a front end and a rear end forming a substantially gas-tight seal with said inside wall with interstices between said missiles, a single pyrotechnic propellant charge body in said launcher tube between said sealed end and said row of missiles, a pressure chamber between said propellant charge body and the front end of said row of missiles, a wall between said pressure chamber and said row of missiles having nozzle holes, pressure regulating means connecting said pressure chamber with the atmosphere, means controlling said regulating means by the speed of the aircraft, a pipe arranged parallel to said launcher tube connecting said pressure chamber with a portion of said launcher tube behind the rear end of said row of missiles, so that initially said row of missiles moves steadily together due to the action of the propellant gases on the one end of said row of missiles, and then once the missiles in said row pass into said portion of said launcher tube, each missile is accelerated from the adjacent missile and ejected from the tube.

2. A missile launcher as claimed in claim 1 wherein a sleeve forms said pressure chamber located between said propellant charge and the front end of said row of missiles, said sleeve having flange-like extensions on both sides containing said nozzle holes.

3. A missile launcher as claimed in claim 1 having an amalgamation of said propellant charge, said sleeve and said missiles in said launcher tube into one transportation unit and having a further tube arrangement, into which said transportation unit can be inserted.

4. A missile launcher as claimed in claim 1 wherein said launcher tube has an aperture on a level with said pressure chamber, with a pressure tube, which is pushed over said launcher tube, a connection piece on said pressure tube over said aperture in said launcher tube, a front tube part having a connection piece on said front tube part and a connecting pipe between two connection pieces arranged parallel to said launcher tube connecting said pressure chamber lying in front of one end of said row of missiles to said tube part lying behind the other end of said row of missiles.

5. A missile launcher as set forth in claim 1 wherein said regulating means controls the gas pressure.

6. A missile launcher as claimed in claim 1 wherein said means controlling said regulating means includes an air pressure-head as the speed measuring device.

7. A missile launcher as claimed in claim 6 including a piston, a spring cooperating with said piston, said piston cooperating with said air pressure-head against the force of said spring, a pipe part connecting said propellant charge body to the open atmosphere having a variable cross section of passage formed by said piston projecting into said pipe part.

References Cited

UNITED STATES PATENTS

| | | | |
|---|---|---|---|
| 2,381,332 | 8/1945 | Boldt | 89—1.5 |
| 2,470,120 | 5/1949 | Walker | 89—1.5 C |
| 2,723,093 | 11/1955 | Price et al. | 244—137 |
| 2,937,573 | 5/1960 | Gantschnigg | 89—1.5 |
| 2,944,772 | 7/1960 | Armstrong et al. | 244—111 |
| 3,065,672 | 11/1962 | Fitzgerald | 89—1.5 |

FOREIGN PATENTS

| | | | |
|---|---|---|---|
| 300,428 | 9/1932 | Italy | 42—76 |

SAMUEL W. ENGLE, Primary Examiner

U.S. Cl. X.R.

89—1.5 F, 14; 244—137